United States Patent
Umeda

(10) Patent No.: US 7,174,091 B2
(45) Date of Patent: Feb. 6, 2007

(54) METHOD AND APPARATUS FOR IMPROVING VIDEO REPRODUCTION QUALITY

(75) Inventor: Shigeyuki Umeda, Tachikawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 1115 days.

(21) Appl. No.: 09/793,087

(22) Filed: Feb. 27, 2001

(65) Prior Publication Data

US 2001/0017977 A1  Aug. 30, 2001

(30) Foreign Application Priority Data

Feb. 29, 2000  (JP)  ............... 2000-054598

(51) Int. Cl.
*H04N 7/26* (2006.01)

(52) U.S. Cl. .................. 386/112; 386/89; 386/57; 386/47; 386/3

(58) Field of Classification Search .............. 386/47, 386/49, 113–116, 111–112, 33, 13–15, 46, 386/85–91, 40, 2–3, 21–24; 348/616; 725/110; 358/22
See application file for complete search history.

(56) References Cited

U.S. PATENT DOCUMENTS

| | | | |
|---|---|---|---|
| 5,241,372 A * | 8/1993 | Ohba | 348/578 |
| 5,920,589 A * | 7/1999 | Rouquette et al. | 375/147 |
| 5,949,956 A * | 9/1999 | Fukuda | 386/112 |
| 6,009,226 A * | 12/1999 | Tsuji et al. | 386/46 |
| 6,035,092 A * | 3/2000 | Fujinami | 386/47 |
| 6,263,119 B1 * | 7/2001 | Martucci | 382/298 |
| 6,353,930 B1 * | 3/2002 | Shimoji et al. | 725/110 |
| 2004/0218489 A1 * | 11/2004 | Otsuka et al. | 369/47.17 |

FOREIGN PATENT DOCUMENTS

JP  64-55987  3/1989

* cited by examiner

*Primary Examiner*—Thai Q. Tran
*Assistant Examiner*—Helen Shibru
(74) *Attorney, Agent, or Firm*—Finnegan, Henderson, Farabow, Garrett & Dunner, L.L.P.

(57) ABSTRACT

A delay detector detects a reproduction delay for a video signal based on a delay notification communicated from a manager to manage the reproduction delay using a state variable. A controller conducts delay recovery control by forcing an image quality improving unit to omit filtering based on the state variable or switching the type of filtering to a simpler one, while avoiding the need to omit decoding of a frame (i.e., frame skipping). This results in a reduction in a load on a processor and recovery of the reproduction delay.

21 Claims, 7 Drawing Sheets

METHOD AND APPARATUS FOR IMPROVING VIDEO REPRODUCTION QUALITY

CROSS-REFERENCE TO RELATED APPLICATIONS

This application is based upon and claims the benefit of priority from the prior Japanese Patent Application No. 2000-054598, filed Feb. 29, 2000, the entire contents of which are incorporated herein by reference.

BACKGROUND OF THE INVENTION

The present invention relates to a method and apparatus for reproducing an encoded video signal, and more particularly, to an improved method and apparatus for reproducing an encoded video signal to produce a smooth video signal.

A variety of electronic devices that support multimedia have been developed in recent years. Such electronic devices include digital video players, set top boxes, digital TVs, digital VCRs, and personal computers. These electronic devices have decoders for reproducing video data that has been encoded using highly efficient coding schemes for videos such as MPEG-2/MPEG-4.

Generally, in these decoders, after a video signal is decoded, a post filter filters the decoded video signal to improve the image quality. Most coding schemes such as MPEG-2/MPEG-4 process video images in blocks, which degrades the decoded image with block noise and edge noise. Block noise is distortion in the decoded signal that appears as block patterns that are not present in the original video image. Edge noise is ringing-like noise (also referred to as "mosquito noise") that occurs near edges.

The post filter removes such noises inherent in the coding scheme. The post filter smoothes a decoded video signal to remove high frequency components in a boundary region between blocks. A decoding apparatus that has such a post filter is known, for example, from Japanese Patent Publication (KOKAI) No. 64-55987. This document discloses a method of first determining whether a block of a video signal output from a decoder is a dynamic block, which includes movements, or a static block, which does not include movements, and then changing the degree of smoothing in the post filter based on this determination to improve the efficiency of the processing. More specifically, if the block is a static block, then smoothing is not performed or hardly performed on the static block. Conversely, if the block is a dynamic block, then smoothing is performed on the dynamic block.

The above method requires excessive time to perform a relatively large amount of calculations, resulting in a delay in the reproduction of the video signal. For example, in a microprocessor-based system that uses software for decoding, decoding a scene that includes rapid movements uses up the processor resource. This causes frequent reproduction delays. These delays are particularly prominent when a video is decoded and reproduced in software in synchronism with audio, resulting in problems such as discrepancy with the audio and dropped frames.

More specifically, when there is a delay in the reproduction of a video signal, frame skipping is typically performed to compensate for the delay, causing decoding to be omitted for several frames. This results in dropped frames, which makes a reproduced image distorted.

Also, in the above referenced patent publication, smoothing is omitted for static blocks even if the processor is available, resulting in unnecessarily degraded image quality.

BRIEF SUMMARY OF THE INVENTION

Accordingly, the present invention is directed to method and apparatus that substantially obviates one or more of the problems due to limitations and disadvantages of the related art.

In accordance with the purpose of the invention, as embodied and broadly described, the invention is directed to a method for reproducing an encoded video signal comprising decoding the encoded video signal to produce a decoded video signal, detecting a reproduction condition, and processing the decoded video signal based on the reproduction condition.

Also, in accordance with the present invention, there is provided an apparatus for reproducing an encoded video signal comprising a decoder configured to decode an encoded video signal, at least one filter configured to filter the decoded video signal, a detector configured to detect a reproduction condition, and a controller configured to control the at least one filter based on the detected reproduction condition.

Further in accordance with the present invention there is provided an article of manufacture comprising a computer usable medium having computer readable program code means embodied therein for reproducing an encoded video signal. The computer readable program code means comprises first computer readable program code means for causing a computer to decode the encoded video signal, second computer readable program code means for causing the computer to perform a filter processing on the decoded video signal, third computer readable program code means for causing the computer to detect a reproduction condition, and fourth computer readable program code means for causing the computer to control the filter processing based on the detected reproduction condition.

Additional advantages of the present invention will be set forth in the description which follows, and in part will be obvious from the description, or may be learned by practice of the present invention.

The advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

Embodiments consistent with the present invention provide a video reproducing method and apparatus that are capable of minimizing the occurrence of frame skipping to reproduce a smooth and high quality video.

Method and apparatus consistent with the present invention decode an encoded video signal, filter the decoded video signal, and control the filtering based on a reproduction condition.

Since the filtering is controlled based on a reproduction condition, it is possible to perform optimal filtering for the reproduction condition. By optimizing the filtering, the amount of processing can be adjusted based on a load on a processor without requiring such processing as frame skipping, thereby making it possible to realize a smooth video.

Reproduction delay can be used as the reproduction condition. When a reproduction delay is detected, the reproduction delay can be recovered by omitting the filtering of the decoded video signal or changing the type of filtering to a simpler one that requires less processing. This prevents frames from dropping due to frame skipping. It is therefore possible to reproduce a smooth video even in a scene including rapid movements. Although omitting the filtering or changing the type of filtering reduces the image quality, the image quality is better than the resulting image quality when a frame is skipped.

Also, by using a state variable to manage the reproduction delay, image quality degradation can be minimized by utilizing multi-stage control, which involves switching the type of filtering to one requiring less processing in a stepwise manner based on the delay and eventually omitting the filtering of the decoded video signal.

Further, the foregoing filtering control and frame skipping may be combined such that the filtering is controlled while the reproduction delay remains within a certain fixed range and the decoding is omitted for a predetermined number of frames when the delay reaches a predetermined value, thereby making it possible to simultaneously accomplish reproduction of a smooth video and normal reproduction free from a failure.

An embodiment of a video reproducing method and a video reproducing apparatus according to the present invention will now be described with reference to the accompanying drawings.

Figure 1:
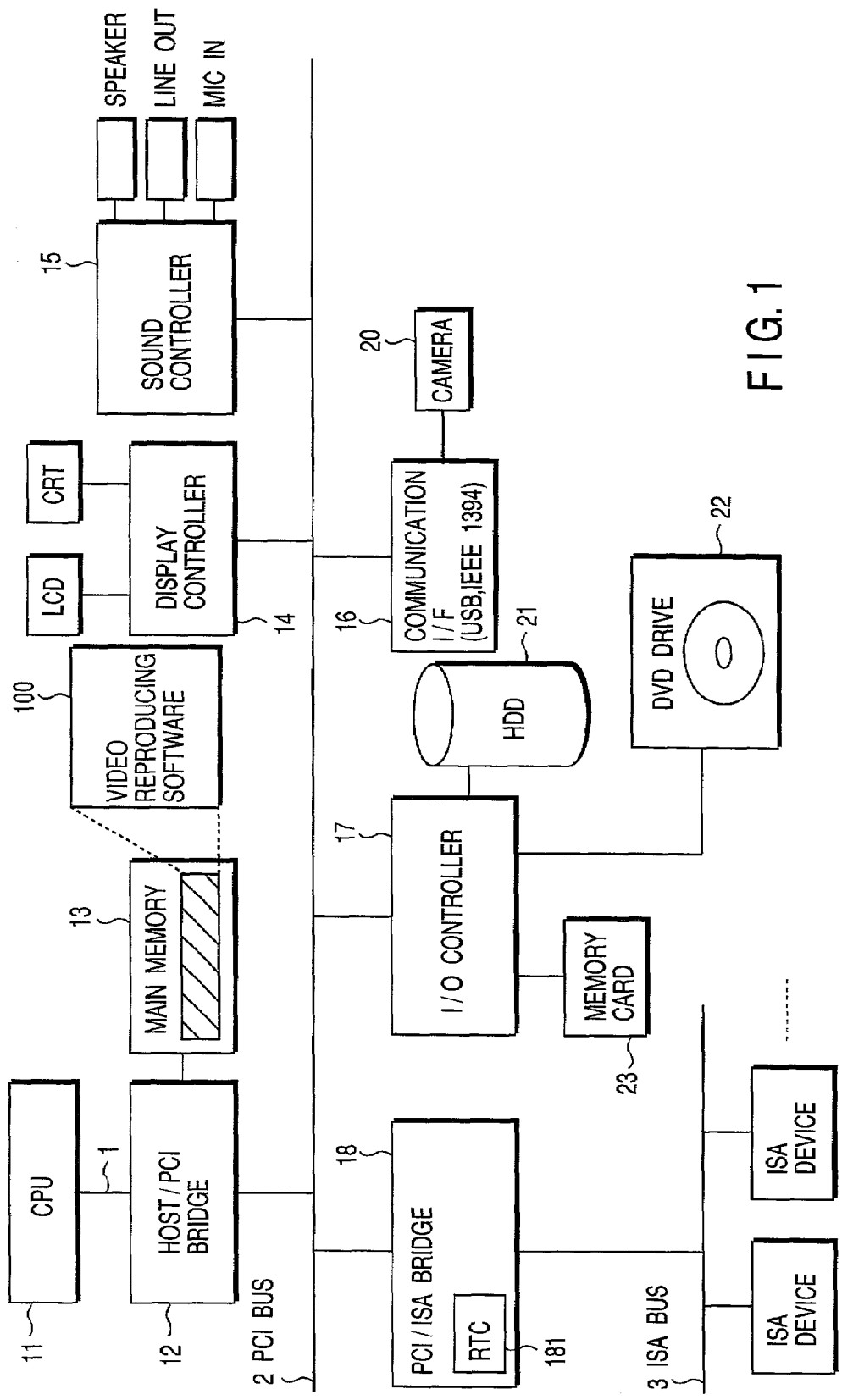
FIG. 1 is a block diagram illustrating a computer system according to an embodiment of the present invention.

FIG. 1 illustrates an exemplary video reproducing apparatus according to an embodiment of the present invention that employs a personal computer. The illustrated personal computer is a notebook type portable computer system that is capable of decoding and reproducing in software an audio/video stream that has been encoded using a coding scheme such as MPEG-2/MPEG-4.

The computer system comprises a CPU 11; a HOST/PCI bridge 12; a main memory 13; a display controller 14;-a sound controller 15; a communication interface 16; an I/O controller 17; a PCI/ISA bridge 18; a camera 20; a hard disk drive (HDD) 21; and a DVD drive 22.

The CPU 11, which is provided to control the overall system, executes an operating system and a variety of other application programs, which are loaded into the main memory 13. A video reproduction software 100 is used as a program for decoding an audio/video stream for reproduction. The video reproduction software 100 supports AV (audiovisual) data in a variety of compression schemes such as MPEG-2, MPEG-4, AVI, and DVI, and is capable of reading a file of encoded AV data and decoding it for reproduction.

The HOST/PCI bridge 12, a bus bridge that interconnects a CPU bus 1 and a PCI bus 2, contains a memory control logic for controlling the main memory 13. The display controller 14 controls an LCD or an external CRT display that is used as a display monitor for the computer system. For reproducing AV data, a decoded video signal produced by the video reproduction software 100 is displayed on the display monitor through the display controller 14.

The sound controller 15, which is used as a sound source, inputs and outputs a variety of audio data. For reproducing AV data, a decoded audio signal produced by the video reproduction software 100 is reproduced from a speaker through the sound controller 15, or output to external audio equipment from a line out terminal.

The communication interface 16 communicates with the external or built-in camera 20 in accordance with a serial interface standard, such as USB or IEEE 1394, and fetches video data or image data from the camera 20. The video data or image data signal captured by the camera 20 may be reproduced for display as it is, or recorded on a variety of recording media such as the HDD 21, the DVD drive 22, or a memory card 23, through the I/O controller 17 after it is compressed in accordance with a coding scheme such as MPEG-2, MPEG-4, AVI, or DVI.

The PCI/ISA bridge 18, a bus bridge that interconnects the PCI bus 2 and an ISA bus 3, contains a variety of system devices such as a real time clock (RTC) 181. The real time clock (RTC) 181 is a timer module that provides the time used in this embodiment to manage a delay in the processing for reproducing AV data.

Video Reproduction Software

Figure 2:
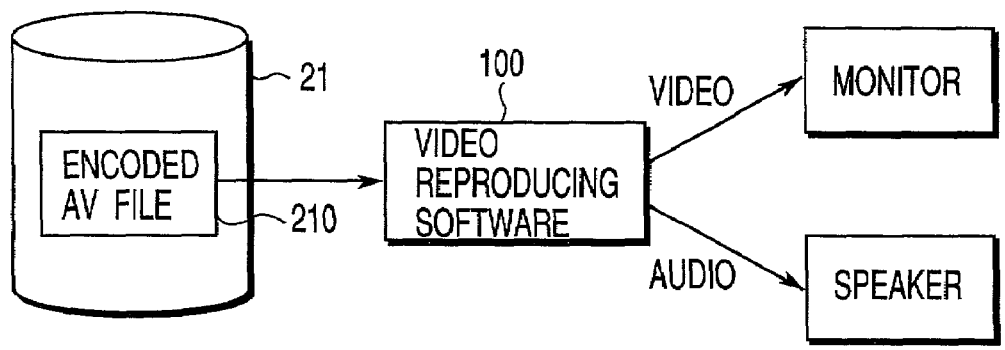
FIG. 2 is a diagram for explaining a basic function of a video reproduction software used in the computer system of FIG. 1.

Basic functions of the video reproduction software 100 will now be described with reference to FIGS. 2 and 3.

As described above, the video reproduction software 100 can read a file of encoded AV data recorded in storage media such as the HDD 21, the DVD drive 22, and the memory card 23, and decode the encoded AV data for reproduction. FIG. 2 illustrates how an encoded AV file 210 recorded in the HDD 21 is decoded for reproduction.

The encoded AV file 210 is produced by compressing a video signal and an audio signal in digital form, and multiplexing encoded bit streams representative of these signals. The video reproduction software 100 retrieves the encoded AV file 210 from the HDD 21, separates the encoded AV file 210 into a video signal and an audio signal, decodes the signals, and displays the video signal on the display monitor while reproducing the audio signal from a speaker, for example.

Figure 3:
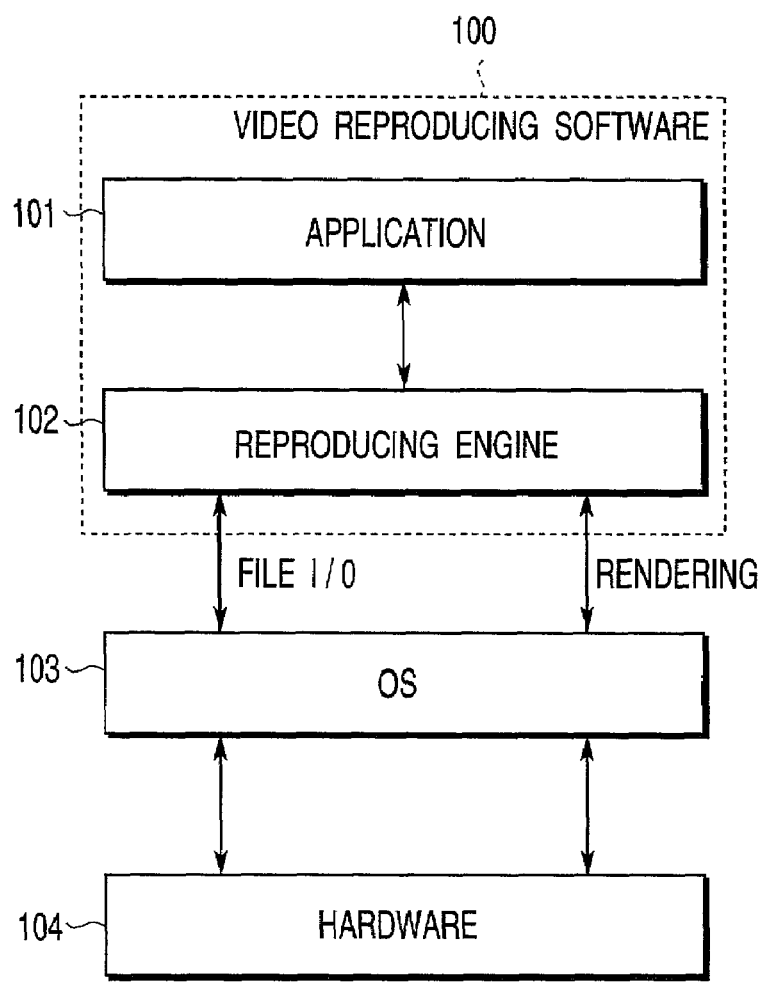
FIG. 3 is a diagram illustrating the configuration of a video reproduction software used in the computer system of FIG. 1.

As illustrated in FIG. 3, the video reproduction software 100 comprises an application program 101 and a reproduction engine 102. The application program 101 has a user interface for the processing involved in the video production and an interface for controlling the reproduction engine 102. The application program 101 instructs the reproduction engine 102 to perform operations required for reproducing the encoded AV file 210 specified by the user. The reproduction engine 102, a platform implemented on an operating system (OS) 103 for multimedia processing, comprises a group of various program modules (filters) for performing the processing required for video and audio reproduction, as exemplified by input/output processing and rendering for video/audio reproduction. These modules can be used in an arbitrary combination by an instruction from the application program 101.

Reproduction Engine

Figure 4:
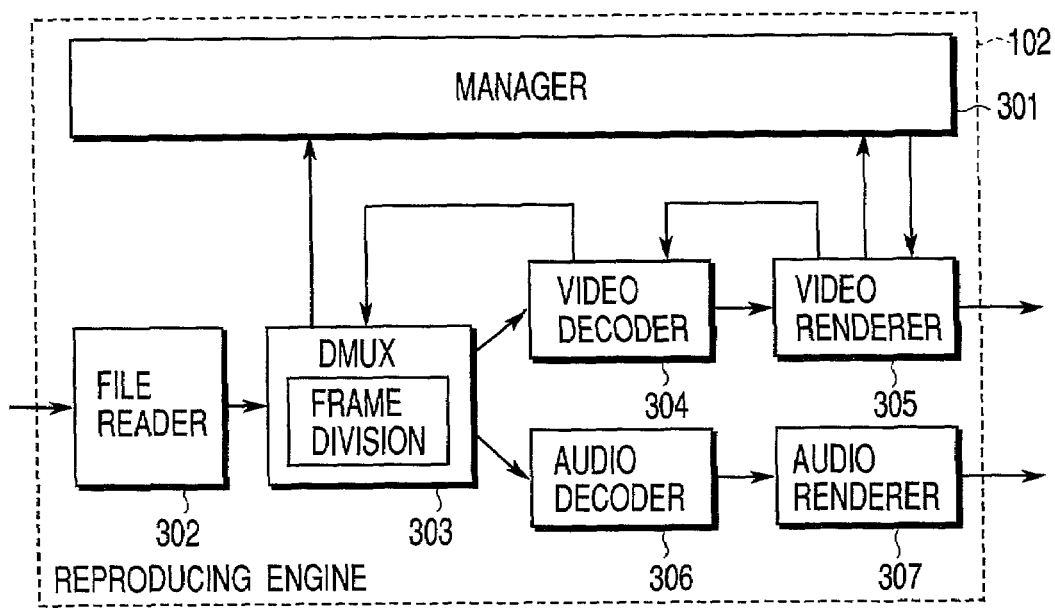
FIG. 4 is a diagram illustrating the functional configuration of a reproduction engine unit used in the video reproduction software of FIG. 3.

Next, the reproduction engine 102 will be described in terms of its functional configuration. FIG. 4 illustrates the configuration of the modules of the reproduction engine 102 during reproduction of an encoded AV file.

Video and audio data included in an encoded AV file is reproduced by linking a manager 301, a file reader 302, a demultiplexer (DMUX) 303, a video decoder 304, a video renderer 305, an audio decoder 306, and an audio renderer 307 as illustrated.

First, file reader 302 reads an encoded file containing an encoded bit stream and sends the encoded bit stream to the demultiplexer (DMUX) 303. DMUX 303 separates the encoded bit stream into video data and audio data.

The video data is separated in frames in the demultiplexer (DMUX) 303 and sent to the video decoder 304 on a frame-by-frame basis. The video decoder 304 includes an image expansion function and a filtering function for improving the image quality of a decoded signal. A decoded video image produced by the video decoder 304 is sent to the display controller 14 through the video renderer 305 and reproduced for display on a monitor. The audio data, on the other hand, is decoded by the audio decoder 306, and sent to the sound controller 15 through the audio renderer 307 for reproduction from a speaker, for example.

Figure 5:
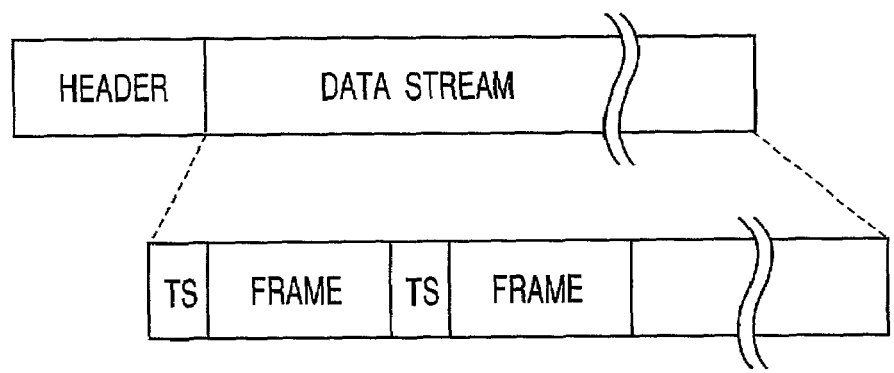
FIG. 5 is a diagram illustrating an exemplary structure of a stream of AV signals for use in the embodiment shown in FIG. 1.

As shown in FIG. 5, one block of encoded video data comprises a block header and a data stream, which includes a plurality of frames and a time stamp TS embedded at the beginning of each frame. Using the time stamp TS, the manager 301 monitors the frame rate of a reproduced signal (i.e., the reproduction speed) by comparing an elapsed time from the beginning of reproduction with a time stamp of a frame that is being reproduced. A reproduction delay occurs when the frame rate of a reproduced signal is lower than the original frame rate. When this delay occurs, the manager 301 notifies the video renderer 305 of the delay. The notification is referred to as a reproduction delay notification. The reproduction delay notification is communicated from the video renderer 305 to upstream modules in order. In other words, a reproduction condition is communicated to the video decoder 304, for example, through the video renderer 305.

Reproduction Delay Notification

Figure 6:
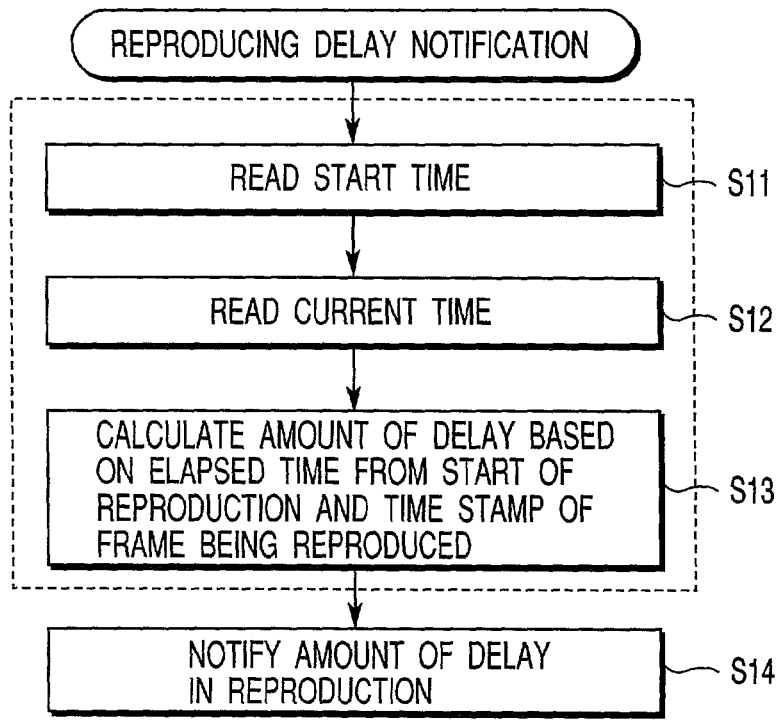
FIG. 6 is a flow chart illustrating reproduction delay notification processing used in the embodiment shown in FIG. 1.

FIG. 6 illustrates a processing procedure for the manager 301 to issue the reproduction delay notification. Upon starting the reproduction of the AV file, the manager 301 acquires the time (start time) from the RTC 181 (step S11). Then, the manager 301 periodically acquires a current time from the RTC 181 (step S12) to determine an elapsed time from the start time. The manager 301 compares the elapsed time with a time stamp of a frame being reproduced and calculates the reproduction delay (step S13). While the time stamp of a frame being reproduced may be acquired from the video renderer 305, the time stamp of a frame several frames after the frame being reproduced may be acquired from the demultiplexer (DMUX) 303 and converted to the value of the time stamp in the frame being reproduced. For encoded data in AVI format, the header including the time stamp is included in a stream that is compressed, for example, in accordance with MPEG-2/MPEG-4, so that a time stamp in AVI format may be utilized instead of the time stamp unique to MPEG-2/MPEG-4.

The calculated reproduction delay is converted to a value representing a reproducing speed, which is then notified to the video renderer 305 (step S14). For example, the value representing the reproducing speed equals 100% when the reproducing speed is at a normal speed. The value decreases as the amount of delay increases.

Video Decoder

Figure 7:
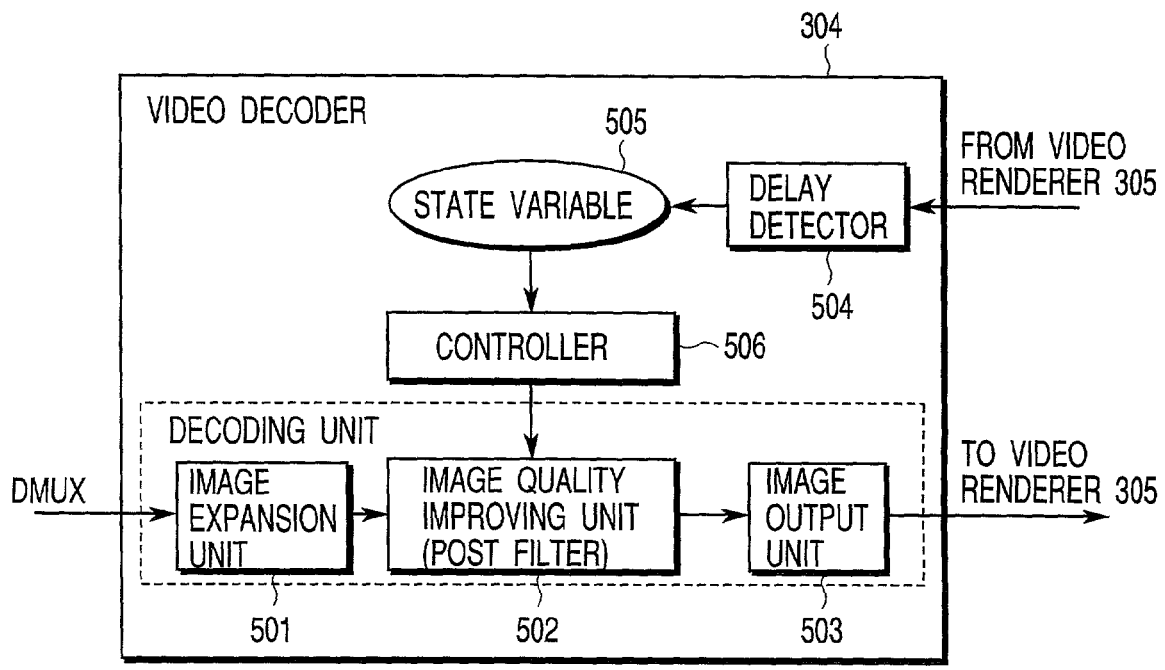
FIG. 7 is a diagram illustrating the functional configuration of a video decoder provided in the reproduction engine unit of FIG. 4.

Next, the configuration of the video decoder 304 will be described with reference to FIG. 7.

The video decoder 304, one module within the reproduction engine 102, comprises an image expansion unit 501; an image quality improving unit (post filter) 502; an image output unit 503; a delay detector 504; a state variable 505; and a controller 506, as illustrated. The image expansion unit 501, the image quality improving unit 502, and the image output unit 503 form a decoding unit for decoding an encoded video signal.

The image expansion unit 501 decodes compressed video, performing processing such as a variable length decoding, inverse-quantization, inverse-DCT, motion compensation prediction, and addition of a predicted image to a differentially decoded image for a video signal compressed in accordance with MPEG-2/MPEG-4. As one frame of a decoded image is produced by the image expansion unit 501, the decoded image is sent to the image quality improving unit 502.

The image quality improving unit 502, a post filter, implements smoothing filtering to reduce block noise to improve the image quality of the decoded image. The image quality improving unit 502 applies to the decoded video signal a variety of filters with different processing speeds and filtering magnitudes by switching the type of filter (IIR filter, FIR filter) and setting filter parameters. Here, since the smoothing filtering is an example of processing for adjusting the image quality, it will hereinafter be referred to as "filtering", including a variety of other image quality adjusting processing.

The controller 506 controls the filtering performed by the image quality improving unit 502.

The image output unit 503 outputs a decoded image processed by the image quality improving unit 502 to the video renderer 305. The delay detector 504, which detects a reproduction delay for a video signal with a delay notification communicated from the manager 301 through the video renderer 305, manages a reproduction delay as a current reproducing condition using the state variable 505.

The controller 506, which controls the operation of the decoding unit, implements control for optimal filtering by the image quality improving unit 502. Specifically, the controller 506 performs delay recovery control to recover the reproduction delay by omitting the filtering performed by the image quality improving unit 502 based on the value of the state variable 505 or switching the type of filtering to a simpler one with a smaller amount of processing. This eliminates the need for omitting the decoding performed by the image expansion unit 501 (i.e., frame skipping). In the following, a specific procedure will be described for the delay recovery control processing.

First Delay Recovery Control

A first example of the delay recovery control processing will be described with reference to FIGS. 8 and 9. In this example, the controller 506 performs delay recovery control processing based on the binary state variable 505. If the binary state variable 505 equals "1", then the controller 506 performs delay recovery control processing by omitting the filtering performed by the image quality improving unit 502. If the binary state variable 505 equals "0", then the controller 506 does not perform delay recovery control processing.

Figure 8:
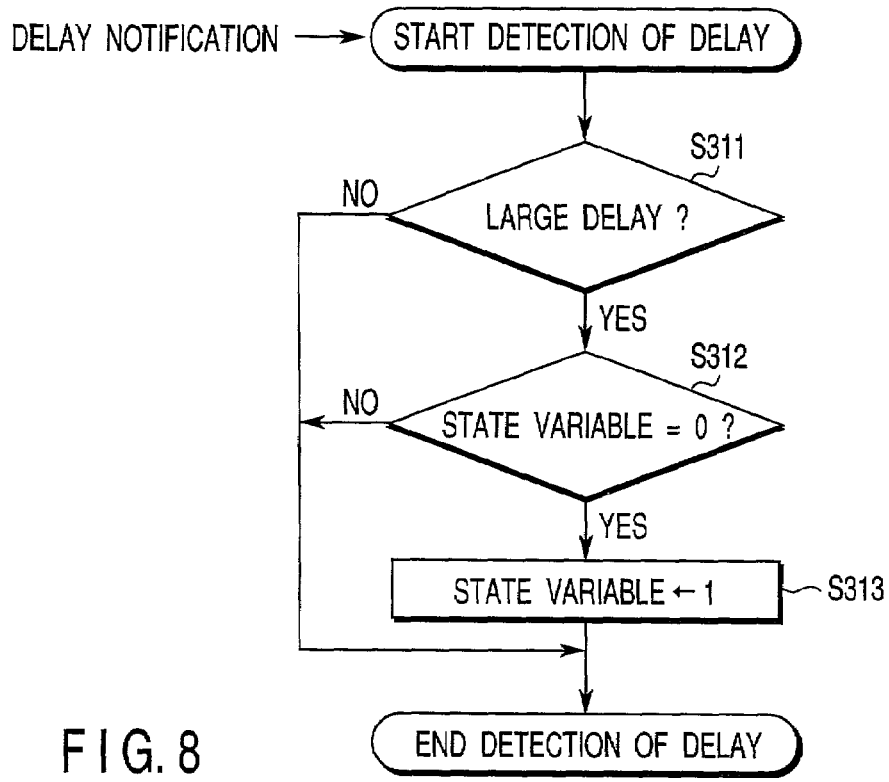
FIG. 8 is a flow chart illustrating a first example of delay detection processing used in the embodiment shown in FIG. 1.

FIG. 8 is a flow chart illustrating delay detection by the delay detector 504. As illustrated in FIG. 8, upon receipt of a reproduction delay notification from the manager 301 through the video renderer 305, the delay detector 504 first determines whether the reproduction delay is larger than a predetermined amount based on the value of a reproducing speed (%) specified by the reproduction delay notification as the amount of delay (step S311). If the reproduction delay is less than or equal to the predetermined amount (NO at step S311), the processing is terminated without performing anything.

However, if the reproduction delay is larger than the predetermined amount (YES at step S311), the delay detector 504 checks the current value of the state variable 505 (step S312).

If the state variable is equal to "0" (YES at step S312), the delay detector 504 changes the value of the state variable to "1" to notify the controller 506 that delay recovery processing is required (step S313). If the state value is equal to "1" (NO at step S312), the processing is terminated without performing anything. In this way, the state variable is set to "1" when the current reproduction delay is large enough to require the delay recovery, and otherwise to "0."

Figure 9:
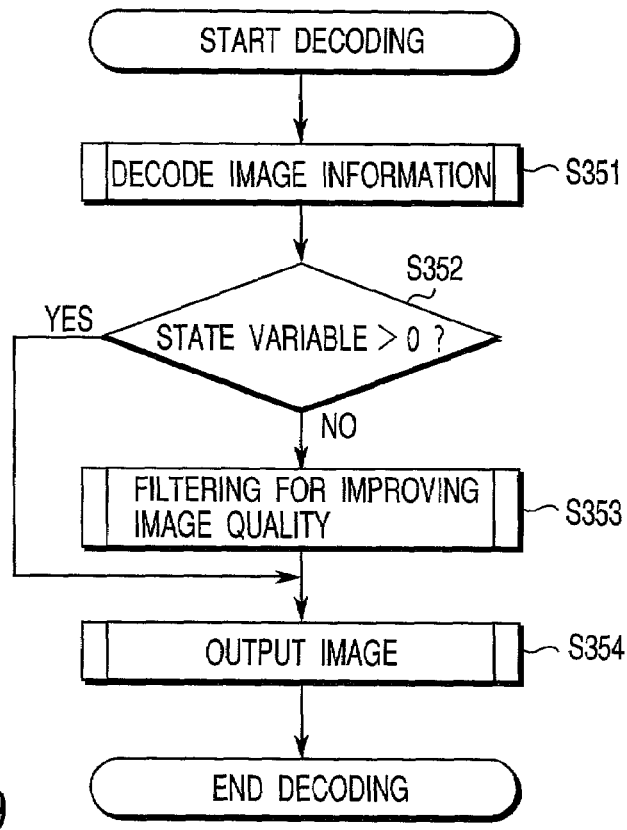
FIG. 9 is a flow chart illustrating a first example of decoding control processing used in the embodiment shown in FIG. 1.

FIG. 9 is a flow chart illustrating control processing by the controller 506 for each frame. First, the image expansion unit 501 performs decoding on a frame of interest (step S351). At the time the decoding is completed for one frame, the controller 506 checks the state variable 505 (step S352). If the state variable 505 is "0" (NO at step S352), the controller 506 delivers the one frame of the decoded image signal to the image quality improving unit 502, as it normally does, forcing the image quality improving unit 502 to perform a predetermined smoothing filtering for improving the image quality (step S353). Then, the filtered image signal is output from the image output unit 503 (step S354).

However, if the state variable is "1" (YES at step S352), the controller 506 skips the filtering which would otherwise be performed by the image quality improving unit 502 for improving the image quality and outputs the decoded image signal as it is from the image output unit 503 (step S354).

In this way, a smooth and high quality video can be reproduced by optimally controlling the filtering without omitting the decoding itself (i.e., without skipping frames/frame dropping), even if the reproduction is delayed due to a heavily loaded processor that is used up by the decoding of a scene including rapid movements.

Second Delay Recovery Processing

Next, a second example of the delay recovery control processing will be described with reference to FIGS. 10 and 11. In this example, to manage a reproduction delay, the controller 506 relies on a four-value state variable 505, which may equal "0", "1", "2", or "3", to change the filtering in a stepwise manner.

Figure 10:
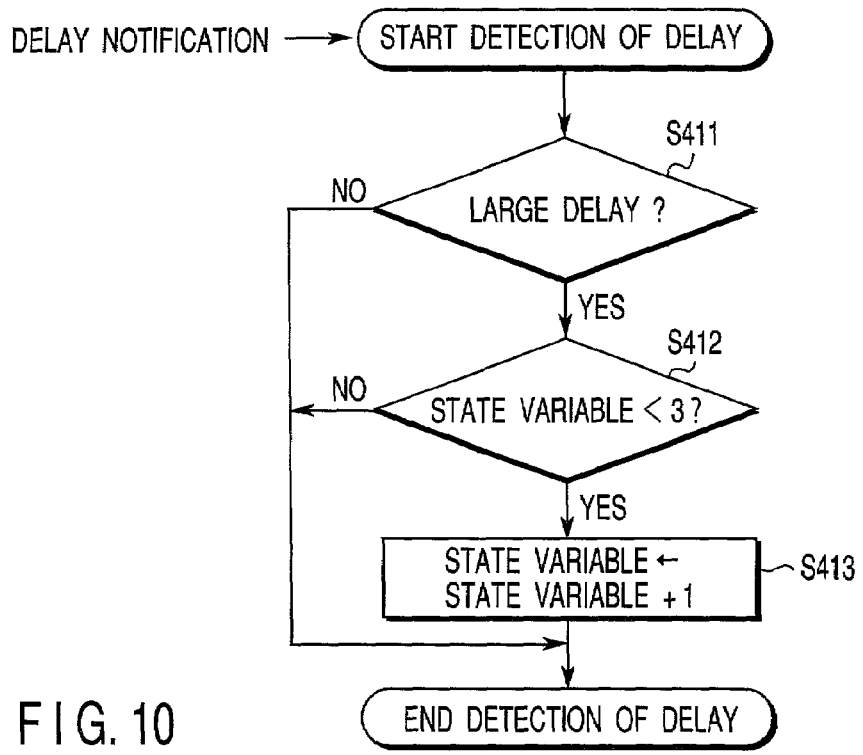
FIG. 10 is a flow chart illustrating a second example of delay detection processing used in the embodiment shown in FIG. 1.

FIG. 10 is a flow chart illustrating delay detection processing by the delay detector 504. As illustrated in FIG. 10, upon receipt of a reproduction delay notification from the manager 301 through the video renderer 305, the delay detector 504 first determines whether the reproduction delay is larger than a predetermined amount based on the value of a reproducing speed (%) specified by the reproduction delay notification as the amount of delay (step S411). If the reproduction delay is less than or equal to the predetermined amount (NO at step S411), the delay detector 504 terminates processing without performing anything. However, if the reproduction delay is larger than the predetermined amount (YES at step S411), the delay detector 504 checks the current value of the state variable 505 (step S412).

If the state variable is lower than the highest value "3" (YES at step S412), the delay detector 504 increments the value of the state variable indicative of the degree of the delay by +1 (step S413). However, if the state variable equals the highest value "3" (NO at step S412), the delay detector 504 terminates processing without performing anything. In this way, the state variable increases as the current reproduction delay increases.

Figure 11:
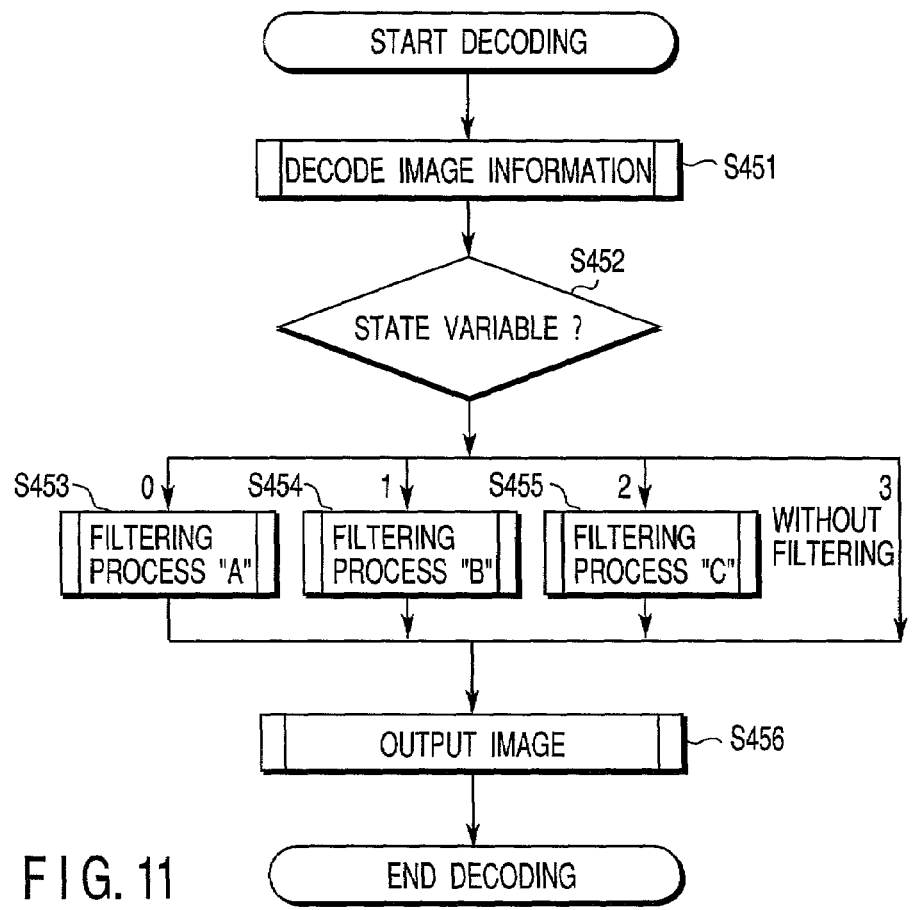
FIG. 11 is a flow chart illustrating a second example of decoding control processing used in the embodiment shown in FIG. 1.

FIG. 11 is a flow chart illustrating control processing by the controller 506 for each frame. First, the image expansion unit 501 decodes a frame of interest (step S451). At the time the decoding is completed for one frame, the controller 506 checks the state variable 505 (step S452) to change the filter based on the value of the state variable 505. In this example, three filtering processes, "A", "B", and "C" having different loads of processing, are provided. The filtering process "A" provides the highest level of image quality improvement, but requires a longer processing time. The filtering process "B" provides the second highest level of image quality improvement; and the filtering process "C", the lowest level. The CPU 11 is loaded more heavily with the filtering in the following order of the filtering processes: "C", "B", "A".

If the state variable equals "0", the controller 506 delivers the one frame of decoded image to the image quality improving unit 502, forcing the image quality improving unit 502 to perform the most time intensive filtering process "A" (step S453). Then, the filtered video signal is output from the image output unit 503 (step S456). Similarly, the controller 506 forces the image quality improving unit 502 to perform the filtering process "B" if the state variable equals "1" and to perform least time intensive filtering process "C" if the state variable equals "2" (steps S454 and S455). However, if the state variable equal the highest value "3", the controller 506 forces the image quality improving unit 502 to skip the filtering for improving the image quality and outputs the decoded image as it is from the image output unit 503 without performing the filtering (step S456).

In this way, a smooth and high quality video without frame dropping can be reproduced free from sudden changes in the image quality. This is achieved by controlling the image quality improving unit 502 to degrade the contents of the filtering gradually in accordance with the delay and to eventually skip the filtering.

Third Delay Recovery Control

Next, a third example of the delay recovery control processing will be described with reference to FIGS. 12 and 13. In this example, a three-value state variable 505, which may equal "0", "1", or "2", determines whether filtering and/or frame skipping will be performed.

Figure 12:
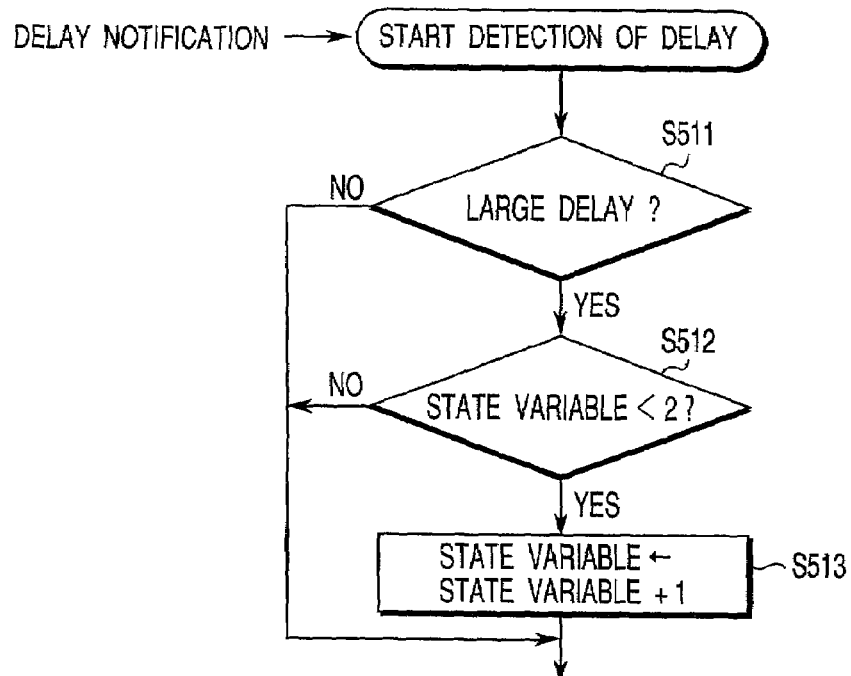
FIG. 12 is a flow chart illustrating a third example of delay detection processing used in the embodiment shown in FIG. 1.

FIG. 12 is a flow chart illustrating the delay detection processing by the delay detector 504. As illustrated in FIG. 12, upon receipt of a reproduction delay notification from the manager 301 through the video renderer 305, the delay detector 504 first determines whether the reproduction delay is larger than a predetermined amount based on the value of a reproducing speed (%) specified by the reproduction delay notification as the amount of delay (step S511). If the reproduction delay is less than or equal to the predetermined amount (NO at step S511), the delay detector 504 terminates processing without performing anything. However, if the reproduction delay is larger than the predetermined amount (YES at step S511), the delay detector 504 checks the current value of the state variable 505 (step S512).

If the state variable is lower than the highest value "2" (YES at step S512), the delay detector 504 increments the value of the state variable indicative of the degree of the delay by +1 (step S513). However, if the state variable equals the highest value "2" (NO at step S512), the delay detector 504 terminates processing without performing anything. In this way, the state variable increases as the current reproduction delay increases.

Figure 13:
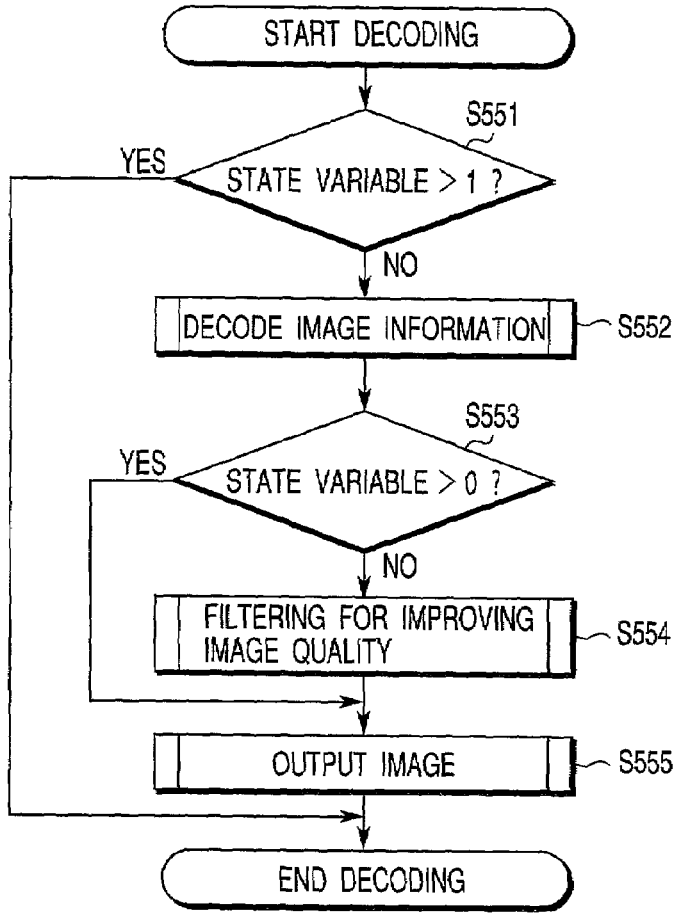
FIG. 13 is a flow chart illustrating a third example of decoding control processing used in the embodiment shown in FIG. 1.

FIG. 13 is a flow chart illustrating control processing by the controller 506 for each frame. Before the image expansion unit 501 decodes a frame, the controller 506 first checks the state variable 505 (step S551). If the state variable 505 equals the highest value "2" (YES at step S511), the decoding, the filtering, and the image output are all skipped, thereby skipping a frame.

However, if the state variable 505 is less than or equal to "1" (NO at step S511), the controller 506 forces the image expansion unit 501 to decode a frame of interest (step S552) and then determines whether the state variable equals "0" or "1" (step S553). If the state variable equals "0" (NO at step S553), the controller 506 delivers the one frame of decoded image to the image quality improving unit 502, as it normally does, forcing the image quality improving unit 502 to perform the smoothing filtering for improving the image quality (step S554). Then, the filtered video signal is output from the image output unit 503 (step S555). However, if the state variable equals "1" (YES at step S553), the controller 506 forces the image quality improving unit 502 to skip the filtering for improving the image quality and outputs the decoded image as it is from the image output unit 503 without performing the filtering (step S555).

In this way, the reproduction of a smooth video and the reproduction of a high quality image can be simultaneously achieved by omitting the filtering when the reproduction delay is within a certain fixed range and by skipping a frame when the delay exceeds the certain range (of course, the filtering is also skipped).

The control processing illustrated in FIG. 13 may also be applied in the aforementioned examples. For example, in the second example, the filtering can be controlled in a stepwise manner when the reproduction delay is within a certain fixed range as describe above with reference to FIG. 11. However, in addition, a frame can be skipped when the delay exceeds the fixed range.

As described above, since a load on a CPU is reduced by controlling the filtering when an increase in a load on the CPU causes a reproduction delay, an image quality adjustment can be optimized based on the load of the CPU, thereby limiting frame skipping, even when a video is decoded in software for reproduction in synchronism with audio.

While the foregoing embodiments have shown an example in which the reproduction delay notification is generated by comparing a time stamp in a frame being reproduced with an elapsed time from the start of reproduction, the degree of delay in reproduction may be detected, for example, based on the amount of occupied buffer, which is controlled in terms of the rate, to control the contents of filtering in accordance with the degree of delay thus detected.

Also, while the foregoing embodiments have not explicitly described specific processing for decrementing the state variable, the value of the state variable may of course be decremented if a delay in reproduction is reduced.

Further, the software-based decoding method according to the foregoing embodiments can be readily implemented by introducing a computer program including the procedure into a normal computer through a computer readable recording medium. In addition, the methods may be applied to such devices as a game machine, a digital television set, or a set top box, as well as to a computer.

As described above, according to the present invention, the filtering for improving the image quality of a decoded image can be controlled to eliminate the frame skipping, thereby making it possible to reproduce a smooth video.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method for reproducing an encoded video signal, the method comprising:
    decoding the encoded video signal to produce a decoded video signal;
    detecting a delay in reproducing the encoded video signal;
    performing an image quality improving process for the decoded video signal by applying at least one post filter; and
    controlling the performing based on the detected delay;
    wherein the at least one post filter is not applied if the delay is greater than a predetermined amount.

2. The method according to claim 1, wherein the image quality improving process comprises a smoothing filtering.

3. The method according to claim 1, wherein the detecting comprises calculating the delay based on a time stamp embedded in the encoded video signal and an elapsed time from a start of reproducing the encoded video signal.

4. The method according to claim 1, wherein the at least one post filter is applied if the delay is less than a predetermined amount.

5. The method according to claim 1, wherein:
the detected delay is represented by a state variable having a value selected from a plurality of values each corresponding to a delay condition;
the at least one post filter includes a plurality of filtering processes respectively corresponding to the plurality of values; and
the controlling further includes applying the at least one post filter to perform one of the plurality of filtering processes based upon the value of the state variable.

6. An apparatus for reproducing an encoded video signal, the apparatus comprising:
a decoder configured to decode an encoded video signal;
an image quality improving processor which performs an image quality improving process for the decoded video signal by applying at least one post filter;
a detector configured to detect a delay in reproducing the encoded video signal; and
a controller configured to control said image quality improving processor based on the detected delay;
wherein the at least one post filter is not applied if the delay is greater than a predetermined amount.

7. The apparatus according to claim 6, wherein the controller selectively operates the image quality improving processor based on the detected delay.

8. The apparatus according to claim 6, wherein the image quality improving processor comprises a plurality of smoothing filters to smooth the decoded video signal and wherein the controller is configured to selectively operate a filter or filters among the plurality of filters based on the detected delay.

9. The apparatus according to claim 6, wherein the detector is configured to calculate the delay based on a time stamp embedded in the encoded video signal and an elapsed time from a start of reproducing the encoded video signal.

10. An article of manufacture comprising a computer usable medium having computer readable program code means embodied therein for reproducing an encoded video signal, the computer readable program code means comprising:
first computer readable program code means for causing a computer to decode the encoded video signal;
second computer readable program code means for causing the computer to perform an image quality improving process for the decoded video signal by applying at least one post filter;
third computer readable program code means for causing the computer to detect a delay in reproducing the encoded video signal; and
fourth computer readable program code means for causing the computer to control the image quality improving process based on the detected delay;
wherein the at least one post filter is not applied if the delay is greater than a predetermined amount.

11. The article of manufacture according to claim 10, wherein said fourth computer readable program code means causes the computer to selectively operate the image quality improving process based on the detected delay.

12. The article of manufacture according to claim 10, wherein said fourth computer readable program code means causes the computer to change a content of the image quality improving process based on the detected delay.

13. The article of manufacture according to claim 10, further comprising fifth computer readable program code means for causing the computer to stop a decoding operation of said first computer readable program code means when the delay is greater than or equal to a predetermined amount.

14. The article of manufacture according to claim 10, wherein said third computer readable program code means causes the computer to detect the delay based on a time stamp embedded in the encoded video signal and an elapsed time from a start of reproducing the encoded video signal.

15. A method for reproducing an encoded video signal, the method comprising:
decoding the encoded video signal to produce a decoded video signal;
performing an image quality improving process for the decoded video signal using a central processing unit;
detecting an operation load of the central processing unit; and
controlling the performing based on the detected load of the central processing unit,
wherein the controlling comprises stopping the performing when the detected operation load is greater than or equal to a predetermined amount.

16. A method for reproducing an encoded video signal, the method comprising:
decoding the encoded video signal to Produce a decoded video signal;
performing an image quality improving process for the decoded video signal using a central processing unit;
detecting an operation load of the central processing unit; and
controlling the performing based on the detected load of the central processing unit,
wherein the detecting comprises calculating the operation load based on a time stamp embedded in the encoded video signal and an elapsed time from a start of reproducing the encoded video signal.

17. An apparatus for reproducing an encoded video signal, the apparatus comprising:
a decoder configured to decode an encoded video signal;
an image quality improving processor which comprises a central processing unit and performs an image quality improving process for the decoded video signal;
a detector configured to detect an operation load of the central processing unit; and
a controller configured to control said image quality improving processor based on the detected load,
wherein the image quality improving processor comprises a plurality of smoothing filters to smooth the decoded video signal and wherein the controller is configured to selectively operate a filter or filters among the plurality of filters based on the detected load.

18. An apparatus for reproducing an encoded video signal, the apparatus comprising:
a decoder configured to decode an encoded video signal;
an image quality improving processor which comprises a central processing unit and performs an image quality improving process for the decoded video signal;
a detector configured to detect an operation load of the central processing unit; and
a controller configured to control said image quality improving processor based on the detected load,
wherein the controller is configured to stop the decoder when the detected load is greater than or equal to a predetermined amount.

19. An apparatus for reproducing an encoded video signal, the apparatus comprising:
a decoder configured to decode an encoded video signal;
an image quality improving processor which comprises a central processing unit and performs an image quality improving process for the decoded video signal;

a detector configured to detect an operation load of the central processing unit; and a controller configured to control said image quality improving processor based on the detected load, wherein the detector is configured to calculate the load based on a time stamp embedded in the encoded video signal and an elapsed time from a start of reproducing the encoded video signal.

20. An article of manufacture comprising a computer usable medium having computer readable program code means embodied therein for reproducing an encoded video signal, the computer readable program code means comprising:

first computer readable program code means for causing a computer to decode the encoded video signal;

second computer readable program code means for causing the computer to perform an image quality improving process for the decoded video signal;

third computer readable program code means for causing the computer to detect an operation load of the computer;

fourth computer readable program code means for causing the computer to control the image quality improving process based on the detected load; and fifth computer readable program code means for causing the computer to stop a decoding operation of said first computer readable program code means when the load is greater than or equal to a predetermined amount.

21. An article of manufacture according to claim comprising a computer usable medium having computer readable program code means embodied therein for reproducing an encoded video signal, the computer readable program code means comprising:

first computer readable program code means for causing a computer to decode the encoded video signal;

second computer readable program code means for causing the computer to perform an image quality improving process for the decoded video signal;

third computer readable program code means for causing the computer to detect an operation load of the computer; and fourth computer readable program code means for causing the computer to control the image quality improving process based on the detected load, wherein said second computer readable program code means causes the computer to detect the load based on a time stamp embedded in the encoded video signal and an elapsed time from a start of reproducing the encoded video signal.

* * * * *